United States Patent [19]

Nimry et al.

[11] 4,413,115

[45] Nov. 1, 1983

[54] COPOLYIMIDES-POLYAMIDES FROM ALIPHATIC AND AROMATIC ANHYDRIDES, DICARBOXYLIC ACIDS, AND DIAMINES

[75] Inventors: Tayseer S. Nimry, Wheaton; Ellis K. Fields, River Forest, both of Ill.

[73] Assignee: Standard Oil Company (Indiana), Chicago, Ill.

[21] Appl. No.: 427,018

[22] Filed: Sep. 29, 1982

Related U.S. Application Data

[63] Continuation-in-part of Ser. No. 286,697, Jul. 24, 1981, Pat. No. 4,366,304.

[51] Int. Cl.$^3$ ............................................ C08G 73/10
[52] U.S. Cl. ................................... 528/189; 428/458; 528/125; 528/128; 528/172; 528/188; 528/206; 528/208; 528/220; 528/229; 528/352; 528/353
[58] Field of Search ............... 528/125, 128, 189, 206, 528/208, 229, 188, 220, 352, 353, 172; 428/458

[56] References Cited

PUBLICATIONS

Nakanishi et al., Aliphatic Poly (Amido Acids) and Polyimides (1973), Polymers 14, 440.

*Primary Examiner*—Lester L. Lee
*Attorney, Agent, or Firm*—Gunar J. Blumberg; William T. McClain; William H. Magidson

[57] ABSTRACT

This invention relates to copolyimides-polyamides prepared from mixtures of tetramethylcyclobutane-1,2,3,4-tetracarboxylic dianhydride (TMCDA), aromatic or aliphatic dianhydrides, and dicarboxylic acids or their esters or acid chlorides. These dianhydride-dicarboxylic acid mixtures are then reacted with aliphatic or aromatic diamines. These novel copolyimides-polyamides are useful in the preparation of molded articles, fibers, films, laminates and coatings.

8 Claims, No Drawings

COPOLYIMIDES-POLYAMIDES FROM ALIPHATIC AND AROMATIC ANHYDRIDES, DICARBOXYLIC ACIDS, AND DIAMINES

This application is a continuation-in-part application of Ser. No. 286,697, filed July 24, 1981, now U.S. Pat. No. 4,366,304.

BACKGROUND OF THE INVENTION

1. Field of the Invention

The field of this invention relates to copolyimides-polyamides prepared from mixtures of tetramethylcyclobutane-1,2,3,4-tetracarboxylic dianhydride (TMCDA), aromatic or aliphatic dianhydrides, and dicarboxylic acids or their esters or acid chlorides. These dianhydride-dicarboxylic acid mixtures are then reacted with aliphatic or aromatic diamines. These novel copolyimides-polyamides are useful in the preparation of molded articles, fibers, films, laminates and coatings.

2. BACKGROUND

It is known to make polyimides from pyromellitic dianhydride and diamines. (See U.S. Pat. No. 3,179,634 (1965).) British Pat. No. 570,858 discloses various processes for making fiber forming polyimides. The following Japanese patents disclose the preparation of polyimides starting with cyclobutane-1,2,3,4-tetracarboxylic dianhydride. F. Nakanishi and M. Hasegawa, Polymers, 14, 440 (1973). JA7123917-S27, JA7137733-S44, JA137734-S44, JA7219710-T23 and JA7219908-T23. In reviewing the references, it is clear the use of TMCDA and aromatic or aliphatic dianhydrides to form copolyimides useful as moldings, fibers, laminates, and coatings has not been contemplated in the prior art. The general object of this invention is to provide novel copolyimides-polyamides based on mixtures of TMCDA and other dianhydride moieties with dicarboxylic acids that are then reacted with either aliphatic, cycloaliphatic, araliphatic or aromatic diamines. Another object is to provide a process for the manufacture of copolyimides-polyamides from TMCDA, other dianhydrides, dicarboxylic acids, and diamines.

We have found that novel copolymides-polyamides can be prepared by reacting TMCDA, aromatic or aliphatic dianhydrides, and dicarboxylic acids with diamines. In this process TMCDA and another dianhydride are mixed together in proportions of about 1:10 to about 10:1 together with dicarboxylic acids in proportions to the total anhydrides of about 1:10 to about 10:1 and these are then reacted with a diamine in a polar nitrogen-containing solvent to form high molecular weight copolyimides-polyamides. In this process both aliphatic, cycloaliphatic, araliphatic and aromatic diamines can be copolymerized with TMCDA and aromatic or aliphatic dianhydrides to form high molecular weight copolyimides-polyamides, together with dicarboxylic acids.

Suitably, in our process for the manufacture of the novel copolymides-polyamides a mixture of the TMCDA-aromatic or aliphatic dianhydride with dicarboxylic acid is reacted with a primary diamine or a mixture of primary diamines. The molar ratio of the TMCDA-dianhydride-dicarboxylic acid mixture to the primary diamine may be in the range of about 1.2:1 to about 1:1.2, preferably in the range of 1 to 1. Advantageously, the reaction is carried out at a temperature of about 180° to about 210° C. for a period of about 4 to 6 hours in a nitrogen-contaning organic polar solvent such as 1-methyl-2-pyrrolidinone, N,N-dimethylacetamide or pyridine. The polycondensation can suitably be carried out at a temperature of 130° to 250° C., preferably at a temperature of about 180° to about 210° C. The water by-product in the polycondensation may be distilled off at about 100°–150° C. or removed by a stream of nitrogen. It can also be azeotroped with an organic solvent such as xylene. The polymerization reaction can be carried out in the melt under an inert atmosphere or in vacuum. The novel copolyimides-polyamides of this invention have the following recurring structure wherein R is a divalent aliphatic or aromatic hydrocarbon radical and R' is a tetravalent aliphatic or aromatic hydrocarbon radical.

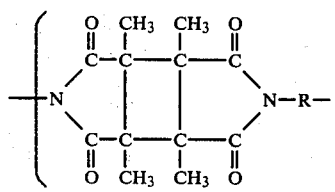

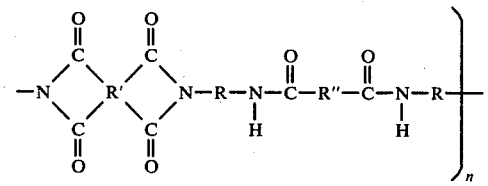

The radicals R and R" may be divalent aliphatic or aromatic hydrocarbons, suitably aliphatic hydrocarbons of 2 to 18 carbon atoms or an aromatic hydrocarbon from 6 to 20 carbon atoms, R is advantageously an aromatic hydrocarbon radical containing from 6 to 10 carbon atoms joined directly or by stable linkage comprising —O—, methylene,

—SO—, —SO$_2$—, and —S— radicals.

The preferred structures for R are the following:

The preferred structures for R' are one of the following:

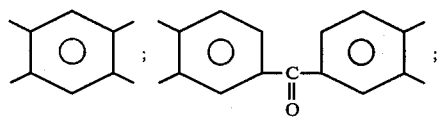

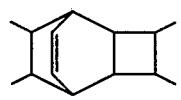

Suitable dicarboxylic acids comprise the following structure:

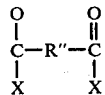

where X is OH, Cl, or O alkyl wherein the alkyl group comprises about 1 to 5 carbon atoms and R" is a divalent hydrocarbon. Advantageously, R" is a divalent aliphatic hydrocarbon containing about 2–18 carbon atoms or an aromatic divalent hydrocarbon radical containing about 1-3 benzene rings, or heterocyclic hydrocarbon radical or a mixture of these. R" moieties are derived from the following representative acids or their halides or esters such as oxalic, glutaric, adipic, azelaic, terephthalic, isophthalic, biphenyl-4,4'-dicarboxylic, 2,6-naphthalene dicarboxylic and pyridine-2,4- and 3,5-dicarboxylic.

The radical R is derived from aliphatic, araliphatic or cycloaliphatic diamines such as ethylenediamine, propylenediamine, 2,2-dimethylpropylenediamine, tetramethylenediamine, hexamethylenediamine, octamethylenediamine, nonamethylenediamine, decamethylenediamine, dodecamethylenediamine, 4,4'-diaminodicyclohexylmethane, xylylene diamine and bis(aminomethyl) cyclohexane; suitable aromatic diamines useful in our process include para- and meta-phenylenediamine, 4,4'-oxydianiline, thiobis (aniline), sulfonylbis (aniline), diaminobenzophenone, methylenebis (aniline), benzidine, 1,5-diaminonaphthalene, oxybis(2-methylaniline), thiobis(2-methylaniline), and the like. Examples of other useful aromatic primary diamines are set out in U.S. Pat. No. 3,494,890 (1970) and U.S. Pat. No. 4,016,140 (1972) both incorporated herein by reference. The peferred diamines are 4,4'-oxydianiline, 1,12-dodecanediamine, and 1,6-hexanediamine.

The dianhydrides are characterized by the following formula:

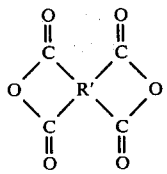

wherein R' is a tetravalent organic radical selected from the group consisting of aromatic, aliphatic, cycloaliphatic, heterocyclic, combination of aromatic and aliphatic, and substituted groups thereof. However, the preferred dianhydrides are those in which the R' groups have at least 6 carbon atoms characterized by benzenoid unsaturation, i.e., alternate double bonds in a ring structure, wherein the 4 carbonyl groups of the dianhydride are each attached to separate carbon atoms and wherein each pair of carbonyl groups is directly attached to adjacent carbon atoms in the R' group to provide a 5-membered ring as follows:

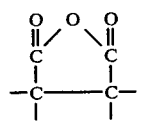

The preferred dianhydrides, as recited above when mixed with TMCDA, yield upon reaction with the diamines copolyimide structures having outstanding physical properties. Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'diphenyl tetracarboxylic dianhydride; 2,2-bis(3,4-dicarboxyphenyl) propane dianhydride; 2,3,4,5-pyrrolidine tetracarboxylic dianhydride; 3,4,9,10-perylene tetracarboxylic dianhydride; bis(3,4-dicarboxyphenyl) ether dianhydride; ethylene tetracarboxylic dianhydride; 3,3',4,4'-benzophenonetetracarboxylic dianhydride; bis(3,4-dicarboxyphenyl)sulfide dianhydride; bis(3,4-dicarboxyphenyl)sulfone dianhydride; bis(3,4-dicarboxyphenyl)methane dianhydride; 1,4,5,8-naphthalenetetracarboxylic dianhydride; tricyclo[4,2,2,0$^{2,5}$]-dec-7-ene-3,4,9,10-tetracarboxylic dianhydride, 3,6-ethenohexahydropyromellitic dianhydride, cyclobutane-1,2,3,4-tetracarboxylic dianhydride, and 1,3-dimethylcyclobutane-1,2,3,4-tetracarboxylic dianhydride. The preferred dianhydride is 3,3',4,4'-benzophenonetetracarboxylic dianhydride.

In some cases the copolyimide-polyamide may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the copolyimide and can be conducted in several ways. However, all techniques require heating the ground or pelletized copolyimide below the melting point of the copolyimide-polyamide, generally at a temperature of about 180° to 210° C. while either sparging with an inert gas such as nitrogen or operating under vacuum. In cases where the polyimides-polyamides have a low melt temperature, they can be copolymerized in the melt under vacuum in thin sections or using thin film reactors known in the art.

Injection molding of the novel copolyimide-polyamide is accompanied by injecting the copolyimide-polyamide into a mold maintained at a temperature of about 50° C. to 150° C. In this process a 20 second to 1 minute cycle is used with a barrel temperature of about 200° C. to 350° C. The latter will vary depending on the $T_g$ of the polymer being molded.

The novel copolyimides-polyamides have excellent mechanical and thermal properties and can readily be molded, formed into fibers, films, laminates, or coatings.

Thermal analysis of the copolyimides-polyamides by thermal gravimetric analysis shows excellent stability. This is demonstrated by the fact that under nitrogen atmosphere 1% weight loss occurs at a temperature of about 320° to 400° C. and the main weight loss occurs at a temperature of about 365° to 435° C. Glass temperature ($T_g$) of the polyimide-polyamide varied with the particular diamine used, as shown in Table 2 and the dianhydride mixture values range from a $T_g$ of 60° to 150° C.

Diamines are suitably copolymerized with TMCDA, aromatic or aliphatic dianhydrides, and dicarboxylic acids by solution condensation in organic polar solvents. Useful polar solvents include, N,N-dimethylacetamide, 1-methyl-2-pyrrolidinone, N,N-dimethylformamide, dimethylsulfoxide, pyridine and the like. Suitable dianhydrides include pyromellitic dianhydride (PMDA), 3,3',4,4'-benzophenone tetracarboxylic dianhydride (BTDA), and the tricyclic tetracarboxylic dianhydride, tricyclo[4,2,2,0$^{2,5}$]dec-7-ene-3,4,9,10-tetracarboxylic dianhydride (TTDA) which is a 2:1 photoadduct of maleic anhydride and benzene.

The copolyimide-polyamide was cast into films. The films were heated at a temperature of 120° C. for one hour. The dry film was 50 microns in thickness and was yellow or white.

The copolyimides-polyamides of this invention are improved by the addition of reinforcing material; particularly the mechanical properties of the copolyimides-polyamides are improved if these copolyimides-polyamides contain from about 25 to 60 percent by weight glass fibers, glass beads, or graphite or mixtures thereof. In the preferred range the polyimides-polyamides contain 30 to 40 percent by weight of the glass fibers, glass beads, or graphite or mixtures thereof. Suitable reinforcing materials can be glass fibers, glass beads, glass spheres, glass fabrics. The glass fibers are made of alkali-free boron-silicate glass or alkali contaning C-glass. The thickness of the fiber is suitably on the average between 3 mm and 30 mm. It is possible to use both long fibers with average lengths of from 5 to 50 mm and short fibers which have an average filament length from 0.05 to 5 mm. In principle, any standard commercial-grade fibers, especially glass fibers, may be used. Glass beads ranging from 5 mm to 50 mm in diameter may also be used as a reinforcing material.

The reinforced copolyimide-polyamide polymers may be prepared in various ways. For example, so-called rovings endless glass fiber strands are coated with the polyamic acid and subsequently granulated. The cut fibers or the glass beads may also be mixed with polyamic acid solution and the resulting mixture is heated to give the reinforced polyimide. Injection molding of the novel glass-filled polyimide-polyamide is accomplished by injecting the polyimide into a mold maintained at a temperature of about 50° to 150° C. In this process a 20 second cycle is used with a barrel temperature of about 200° to 350° C. The injection molding conditions are given in Table 1.

| Mold Temperature | 50° to 150° C. |
| --- | --- |
| Injection Pressure | 15,000 to 19,000 psi and held for 1 to 3 seconds |
| Back Pressure | 100 to 220 psi |
| Cycle Time | 20 seconds |
| Extruder: Nozzle Temperature | 200° to 350° C. |
| Barrels: Front heated to | 200° to 350° C. |
| Screw: 20 to 25 revolutions/minute | |

The following examples illustrate the preferred embodiment of the invention. It will be understood that the examples are for illustrative purposes only and do not purport to be wholly definitive with respect to conditions or scope of the invention. Furthermore, the structures given are not intended to convey block-type copolymers but are shown here to illustrate one possible arrangement.

EXAMPLE 1

The polycondensation reaction was carried out under a nitrogen atmosphere and anhydrous conditions.

To a stirred solution of 6.0 (0.03 mole) of oxybisaniline in 120 ml of N-methyl-2-pyrrolidinone (NMP) at 85° C. under $N_2$ at 50 cc/min was added in one portion to a mixture of 2.52 g (0.01 mole) of 1,2,3,4-tetramethyl-cyclobutane-1,2,3,4-tetracarboxylic dianhydride (TMCDA), 2.18 g (0.01 mole) of pyromellitic dianhydride, and 1.92 g (0.01 mole) of dimethyl terephthalate. Temperature was increased to 190° C. over 2 hours and kept there an additional 3 hours. The solution was cooled to 92° C. and poured into 400 ml of water in a blender. The precipitated copolyimide-polyamide was collected on a filter, washed with 3 100 ml portions of water, and dried in a vacuum oven overnight. The copolyimide-polyamide weighed 8.69 g (93% yield) and had an intrinsic viscosity in 60/40 phenol/tetrachloroethane of 0.61.

Analysis: Calculated for $(C_{66} H_{42} N_3 O_{13})_n$, C,76.7; H,4.1; N,4.1. Found: C,76.2; H,3.9; N,4.0.

EXAMPLE 2

To a stirred mixture of 2.52 g (0.01 mole) of TMCDA, 3.08 g (0.01 mole) of benzophenone-3,4,3',4'-tetracarboxylic dianhydride, and 1.92 g (0.01 mole) of dimethyl isophthalate in 100 ml NMP at 80° C. under $N_2$ at 50 cc/min was added a solution of 3.48 g (0.03 mole) of 1,6-hexanediamine in 10 ml NMP in one portion. Temperature was increased to 185° C. over 1½ hours and maintained there for 3 hours longer. Workup as in Example 1 gave an off-white copolyimide-polyamide, 9.16 g (95% yield) that had an intrinsic viscosity of 0.51.

Analysis: Calculated for $(C_{55} H_{62} N_3 O_{11})$, C,70.2; H,6.6; N,4.5. Found: C,69.8; H,6.5; N,4.4.

EXAMPLE 3

To a stirred mixture of 2.52 g (0.01 mole) of TMCDA, 2.72 g (0.01 mole) of tricyclo[4.2.2.0$^{2,5}$]dec-7-ene-3,4,9,10-tetracarboxylic dianhydride, and 1.46 g (0.01 mole) of adipic acid in 100 ml NMP at 100° C. under $N_2$ at 50 cc/min was added a solution of 6.0 g (0.03 mole) of 1,12-dodecanediamine in 15 ml NMP. Temperature was increased to 185° C. over 2 hours and kept there for 3 hours longer. Workup as in Example 1 gave the copolyimide-polyamide, 10.46 g (90% yield) that had an intrinsic viscosity of 0.47.

Analysis: Calculated for $(C_{68} H_{96} N_6 O_{10})_n$, C,70.6; H,8.3; N,7.3. Found: C,69.9; H,8.1; N,6.9.

We claim:

1. A copolyimide-polyamide comprising the following recurring structure:

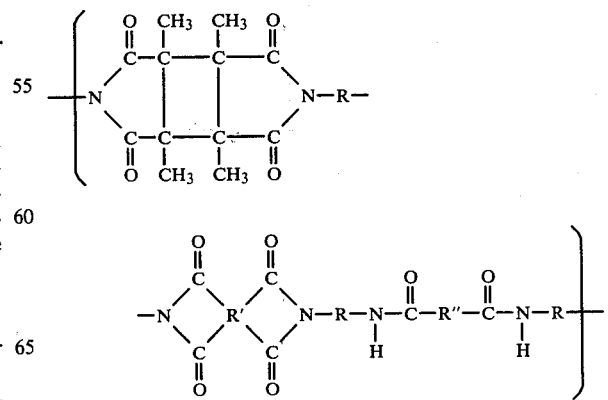

wherein R and R" are the same or different divalent aliphatic or aromatic hydrocarbon radicals and R' a tetravalent aliphatic or aromatic radical.

2. The polymer of claim 1 wherein R and R' are the same or different aliphatic hydrocarbons from 2 to 18 carbon atoms.

3. The copolyimide-polyamide of claim 1 wherein R and R' are the same or different aromatic hydrocarbons from 6 to 20 carbon atoms.

4. The copolyimide-polyamide of claim 1 wherein the copolyimide-polyamide is in the form of a molded object.

5. The copolyimide-polyamide of claim 1 wherein the copolyimide-polyamide is in the form of a laminate.

6. The copolyimide-polyamide of claim 1 wherein the copolyimide-polyamide is in the form of a film.

7. The copolyimide-polyamide of claim 1 wherein the copolyimide-polyamide is in the form of a metal coating suitable for electrical service.

8. A copolyimide-polyamide comprising the following recurring structure:

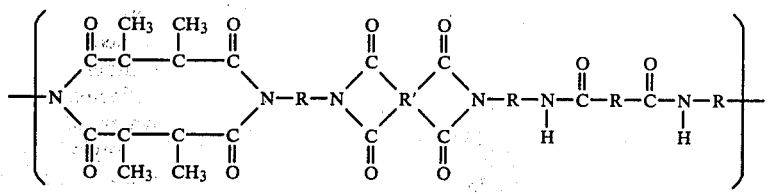

wherein R is an aromatic hydrocarbon radical comprising from about 6 to about 10 carbon atoms joined directly or by stable linkage consisting essentially of —O—, methylene,

—SO—, —SO$_2$—, and —S— radicals and R" is a divalent aliphatic or aromatic hydrocarbon radical and R' is a tetravalent aliphatic or aromatic radical.

* * * * *

UNITED STATES PATENT OFFICE
CERTIFICATE OF CORRECTION

Patent No. 4,413,115      Dated November 1, 1983

Inventor(s) Tayseer S. Nimry and Ellis K. Fields

It is certified that error appears in the above-identified patent and that said Letters Patent are hereby corrected as shown below:

Patent reads:

| Col. | Line | | |
|---|---|---|---|
| 1 | 60 | "copolymides-polyamides" and should read | "copolyimides-polyamides" |
| 4 | 65 | "include, N,N-dime-" and should read | "include N,N-dime-" |
| 8 | 9-10 | "...C-R-C..." (with two C=O) and should read | "...C-R-C..." (with two C=O) |
| 2 | 50 | "...$_{12}$-; O - φ -" and should read | "...$_{12}$-; 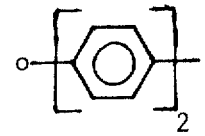" |

Signed and Sealed this

Twenty-fourth Day of April 1984

[SEAL]

Attest:

GERALD J. MOSSINGHOFF

Attesting Officer     Commissioner of Patents and Trademarks